US009083823B2

(12) United States Patent
Balakrishnan

(10) Patent No.: US 9,083,823 B2
(45) Date of Patent: Jul. 14, 2015

(54) CONTEXT ORIENTED BILLING

(71) Applicant: Aeris Communications, Inc., Santa Clara, CA (US)

(72) Inventor: Subramanian Balakrishnan, Cupertino, CA (US)

(73) Assignee: AERIS COMMUNICATIONS, INC., Santa Clara, CA (US)

( * ) Notice: Subject to any disclaimer, the term of this patent is extended or adjusted under 35 U.S.C. 154(b) by 25 days.

(21) Appl. No.: 13/945,571

(22) Filed: Jul. 18, 2013

(65) Prior Publication Data

US 2014/0273936 A1   Sep. 18, 2014

Related U.S. Application Data

(60) Provisional application No. 61/784,999, filed on Mar. 14, 2013.

(51) Int. Cl.
| | |
|---|---|
| *H04M 11/00* | (2006.01) |
| *H04M 1/66* | (2006.01) |
| *H04M 3/42* | (2006.01) |
| *H04M 1/00* | (2006.01) |
| *G06Q 10/00* | (2012.01) |
| *G06Q 20/00* | (2012.01) |
| *G06Q 30/00* | (2012.01) |
| *G06Q 40/00* | (2012.01) |

(Continued)

(52) U.S. Cl.
CPC .............. *H04M 15/80* (2013.01); *H04W 4/005* (2013.01); *H04W 4/24* (2013.01); *H04M 15/44* (2013.01)

(58) Field of Classification Search
CPC ..... H04M 15/61; H04W 4/0005; H04W 8/26; H04W 4/24; H04W 67/12; H04W 12/06; H04W 84/20; H04W 8/005; H04W 4/003; H04W 4/005; H04W 4/12; H04W 88/04; H04W 88/182; H04W 24/00; H04W 28/0268; H04W 48/16; H04W 4/00; H04W 4/008; H04W 4/08
USPC .............. 455/344, 406–407, 456.1, 405, 411, 455/414.1, 552.1; 705/3, 7.11, 26.1, 35, 705/14.26, 2, 14.17, 14.64, 16, 41, 64, 71, 705/30, 39; 370/259, 338
See application file for complete search history.

(56) References Cited

U.S. PATENT DOCUMENTS 7,945,240 B1 * 5/2011 Klock et al. ................... 455/406
2002/0156749 A1 * 10/2002 Sardy .............................. 705/80

(Continued)

FOREIGN PATENT DOCUMENTS

WO        WO 01/37528        *    5/2001    .............. H04M 3/42

OTHER PUBLICATIONS

The International Search Report and The Written Opinion of the International Searching Authority for International Application No. PCT/US2014/029528, mailed Nov. 21, 2014.

*Primary Examiner* — Inder Mehra
(74) *Attorney, Agent, or Firm* — Sawyer Law Group, P.C.

(57) ABSTRACT

The present invention is directed toward networks and more particularly to a method and system for providing information related to context-oriented billing in such networks. In one more embodiments, a computer implemented method provides for billing invoices in response to one or more of a customer's network elements which have been correlated with detailed network data, classified into one or more billing event categories, and rated in accordance with a predetermined hierarchy.

10 Claims, 6 Drawing Sheets

(51) Int. Cl.
   *H04M 15/00* (2006.01)
   *H04W 4/00* (2009.01)
   *H04W 4/24* (2009.01)

(56) References Cited

U.S. PATENT DOCUMENTS

| | | |
|---|---|---|
| 2005/0053211 A1 | 3/2005 | Bevente et al. |
| 2006/0085301 A1 | 4/2006 | Leahy |
| 2006/0265302 A1* | 11/2006 | Schmalenberger et al. .... 705/35 |
| 2008/0059346 A1 | 3/2008 | Schweitzer et al. |
| 2008/0204792 A1 | 8/2008 | Frost |
| 2009/0098854 A1* | 4/2009 | Park et al. ................. 455/407 |
| 2010/0274588 A1* | 10/2010 | Choubey ....................... 705/3 |
| 2011/0016321 A1* | 1/2011 | Sundaram et al. ............ 713/171 |
| 2011/0087550 A1 | 4/2011 | Fordyce, III et al. |
| 2012/0143733 A1 | 6/2012 | Kappauf |
| 2012/0329424 A1 | 12/2012 | Gudlavenkatasiva et al. |
| 2013/0132854 A1* | 5/2013 | Raleigh et al. ................ 715/738 |

* cited by examiner

CONTEXT ORIENTED BILLING

CROSS-REFERENCE TO RELATED APPLICATIONS

Under 35 USC 119(e), this application claims priority to U.S. provisional application Ser. No. 61/784,999, filed on Mar. 14, 2013, and is related to U.S. application Ser. No. 13/945,645, filed Jul. 18, 2013, entitled "M2M BILLING RECONCILIATION", and U.S. application Ser. No. 13/945,689, filed Jul. 18, 2013, entitled "ADAPTIVE M2M BILLING," both assigned to the assignee of the present invention, all of which are incorporated herein by reference in their entireties.

FIELD OF THE INVENTION

The present invention is directed toward networks and more particularly to a method and system for providing information related to context-oriented billing in such networks.

BACKGROUND

Machine to Machine (M2M) systems networks are utilized to provide communications between machines. In an M2M system, typically one or more machines using network resources communicates with a remote application infrastructure for the purposes of monitoring and controlling either the "machine" itself or the surrounding environment. There is a desire to accurately utilize the billing information associated with networks of this type and to provide a context-oriented billing arrangement. The present invention is directed to such a need.

SUMMARY

In one or more embodiments, a computer implemented method is disclosed. The computer implemented method comprises categorically correlating network data into one or more billing events and providing one or more billing invoices in relation thereto. The computer implemented method also comprises rating categorized data for billing invoice processing. Further, the computer implemented method comprises providing billing invoices in response to one or more of a customer's network elements which have been correlated with detailed network data, classified into one or more billing event categories, and rated in accordance with a predetermined hierarchy.

DETAILED DESCRIPTION

The present invention is directed toward networks and more particularly to a method and system for providing information related to billing in such networks.

The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

Figure 1:
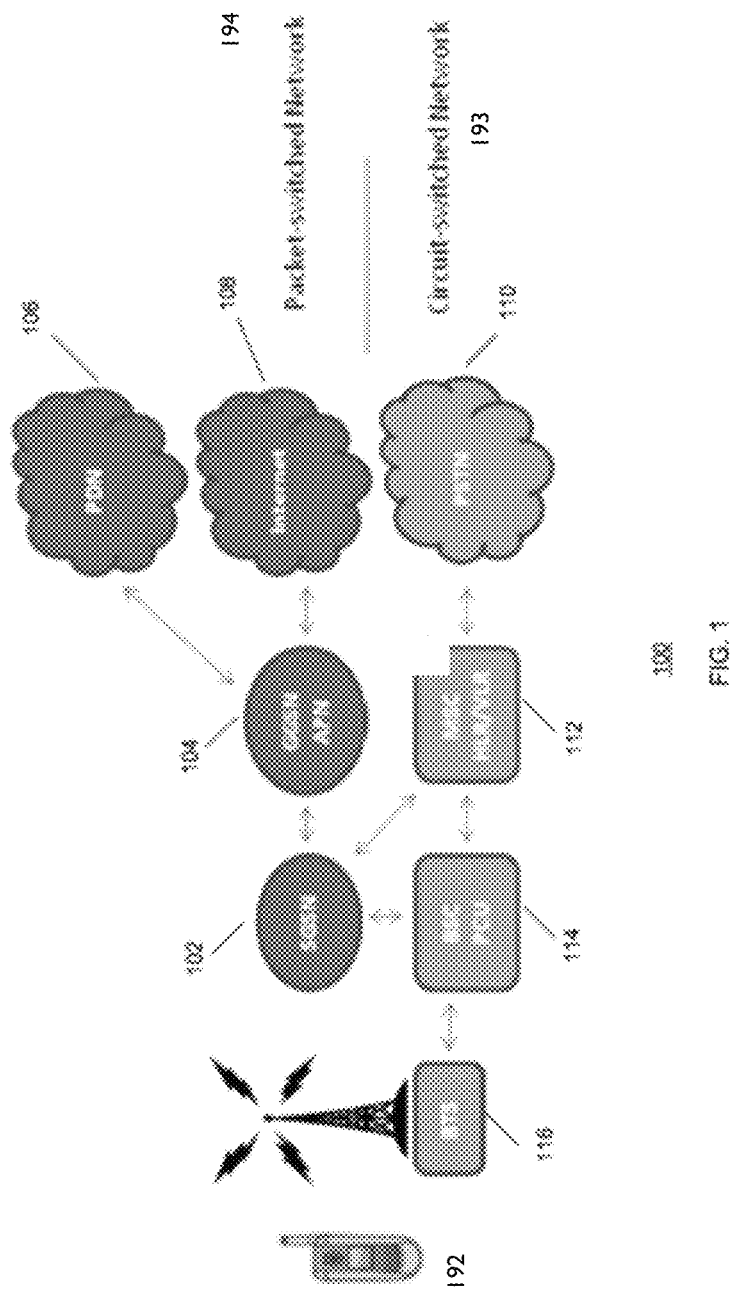
FIG. 1 illustrates a block diagram of a basic M2M network.

FIG. 1 illustrates a block diagram of a basic M2M network 100. The M2M network 100 comprises a circuit-switched voice network 193 that connects mobile handsets 192 with the public switched telephone network (PSTN) 110. Overlaid on top of the network is a packet-switched data network 194. Although circuit-switched SMS messages are used in M2M applications, increasingly M2M data is sent in packet format.

Base station controllers (BSCs) 114 control a number of base transceiver stations (BTSs) 116 that control the actual radio towers and interact with the handsets 192. Packet control units (PCUs) 114 transfer packets bound for the General Packet Radio Service (GPRS) network to a local service GPRS support node (SGSN) 102. Home location registers (HLRs) are a function on both the GSM and GPRS network, and essentially serves to identify mobile stations/end-points with specific account information. The SGSN establishes the packet data protocol (PDP) context with the Gateway GPRS support node (GGSN) 10. Upon activation packets bound for external networks (e.g., the Internet 108 or corporate private data networks (PDNs) 106) pass through the mobile packet gateway. Each mobile network gateway contains a number of virtual and physical access point nodes (APNs) 104 that define the specific external network, whether public or private, to which the packet is destined.

Mobile packet gateways like GGSNs along with HLRs are two of the most critical network elements relative to M2M service deliver in the mobile network. Mobile packet gateways provide security, Quality of Service (QoS) enforcement, and interaction with charging and billing systems for mobile data service. Mobile packet gateways are also central to interconnecting the mobile infrastructure with 3rd-party networks, most importantly ASPs in the case of the M2M market. HLRs are critical to service creation and management of remote devices in the field.

As used herein the term M2M communication is understood to include methods of utilizing various connected computing devices, servers, clusters of servers, wired and/or wirelessly, which provide a networked infrastructure to deliver computing, processing and storage capacity as services where a user typically accesses.

Figure 2:
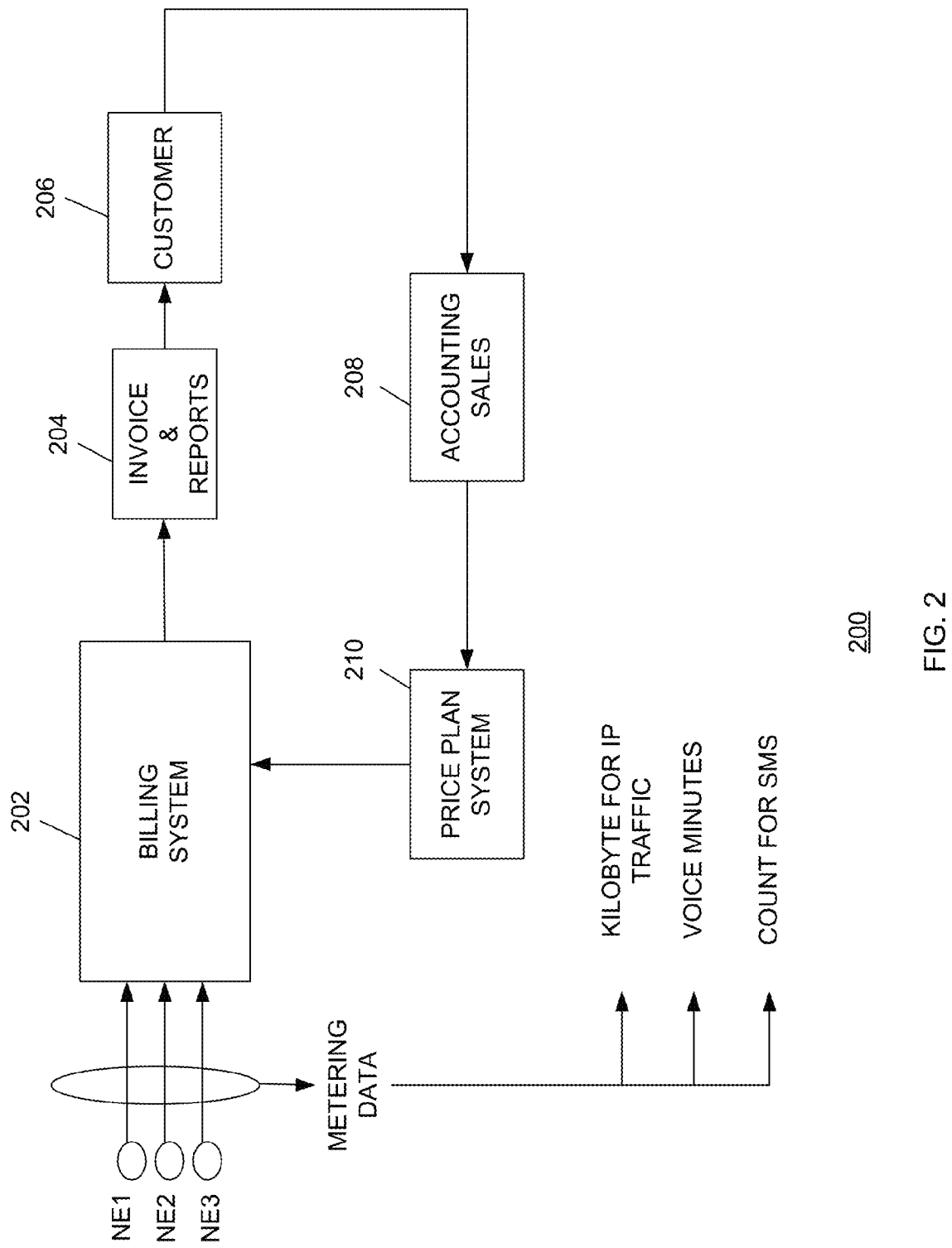
FIG. 2 illustrates a conventional billing system architecture.

FIG. 2 illustrates a conventional billing system architecture 200 utilized with M2M networks. The architecture 200 includes a network having network elements (NEx) (e.g. devices connected to the network such as machines, phones, communicators, etc.) 201A, 201B, 201C, a billing and administration system (BAS) 202, an invoice and reporting function 204, a customer function 206, an accounting and sales function 208, and a price plan system 210.

The BAS 202 provides for receiving data input from the NEs and also provides for calculating and determining billing and related administrative information for customer accounts in relation to the NE devices being used on the associated network; the calculated billing and related administrative information is provided as input to the invoice and reporting function. The invoice and reporting function 204 provides for generating an invoice based on an arrangement between the network operator and the customer, typically in the form of a billing relating information about expenses arising from the NEs activity associated with the operator's network. Once input data is processed by the invoice and reporting function, billing details and routing of invoices, as one example, are then output to the customer function 206 in accordance with customer account details.

The customer function 206 provides for interaction with the customer and includes providing for arranging billing to the customer as well as receiving input from the customer (such as with discrepancies, account updates, device updates, other communications, etc.). Updates and requests from the customer function are input to the accounting and sales function 208. The accounting and sales function 208 may update, add, subtract and otherwise modify information associated with a customer's account, including device updates and billing plans, such that the BAS processing more accurately reflects the activities and administrative aspects of the customer account. The accounting and sales function 208 will output information to the Price Plan system including modifications to a customer's pricing plan and updated pricing plans available to the customer to better reflect a customer's needs. The Price Plan system 210 provides for information concerning the available billing, usage, device activity and associated network operations information concerning a customer's account. The pricing plans of a Price Plan system 210 may change from time to time to better reflect customer and market needs. The Price Plan system 210 outputs updates of the Price Plan as input to the BAS 202.

From FIG. 2, operatively, after receiving input of the NEs and the associated Price Plan system information, the BAS calculates a customer's bill based upon the price plan for the network elements. The calculated bill is output as input to the invoice and reporting function. The invoice and reporting function then generates invoices and routes the invoices to the customer, along with other reports as may be defined by the customer or operator. The customer receives the billings and reports via the customer function and may provide feedback or additional response, which when received is input to the accounting and sales function (e.g. accounting department) may then act in response to the customer feedback to adjust a billing, modify the account, adjust a price plan, and similar. Output from the accounting and sales function is processed by the Price Plan System to update pricing plan information which is then used by the BAS to calculate billings in a further activity.

Figure 3:
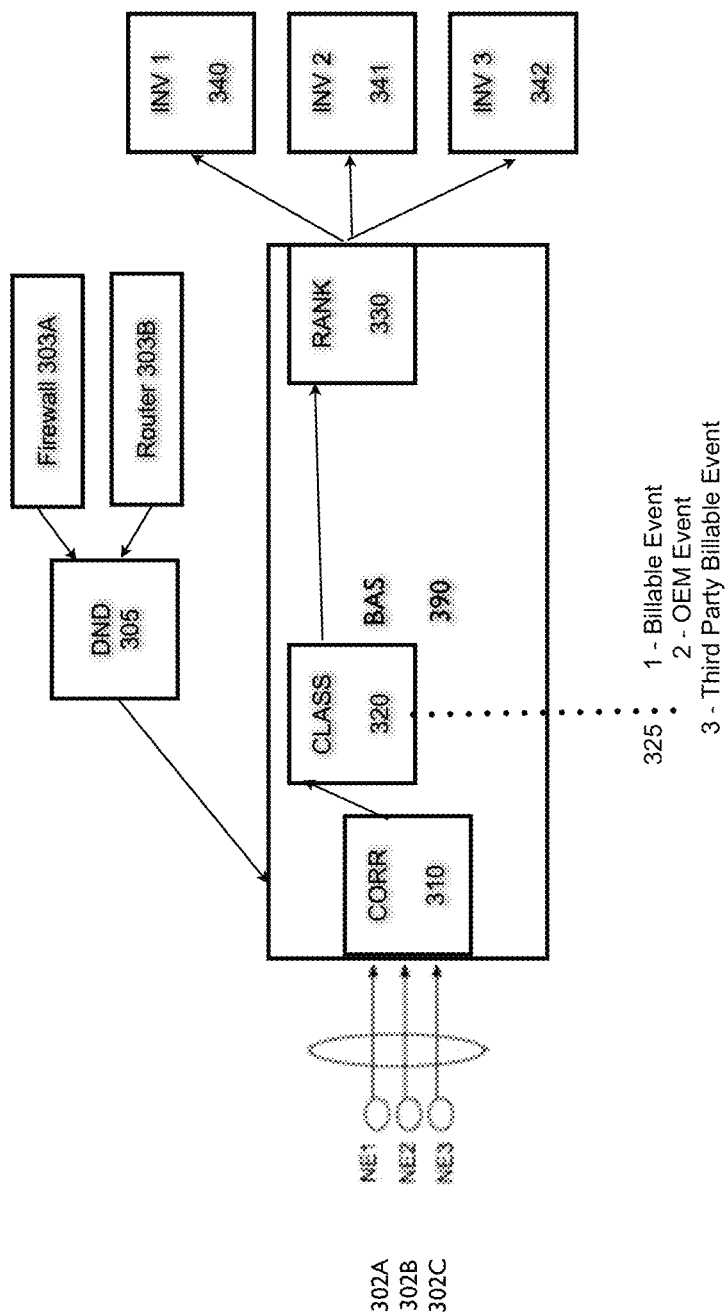
FIG. 3 illustrates a billing system architecture in accordance with an embodiment of the present invention in which categorized billing invoices are provided in response to one or more of a customer's network elements.

FIG. 3 illustrates a billing system architecture 300 in accordance with an embodiment of the present invention in which categorized billing invoices 340, 341, 342 are provided in response to one or more of a customer's network elements 302A, 302B, 302C. In one embodiment, the present invention comprises one or more NEs (302A, 302B, 302C) and a correlating BAS 390 for generating one or more invoices in response to a predetermined method of correlating, classifying and ranking billable events associated with the network. In another embodiment, the present invention comprises one or more NEs, a correlating BAS 390, an invoice and reports function, a customer function, an accounting and sales department, and a Price Plan System, wherein the correlating BAS further comprises a correlator, a classifier and a ranking engine.

From FIG. 3, each NE (302A, 302B, 302C) may provide data to the BAS 390 in a variety of ways such as by streaming the data, sharing the data and/or batch delivering the data, where, for each situation, the routine of how much data, what type of delivery and when the data is provided to the BAS may also vary by NE device. NE1-NE3 could be any type of device, appliance, terminal, remote device, wireless asset, etc. are intended to be inclusive, interchangeable, and/or synonymous with one another and other similar communication-based equipment for purposes of the present invention though one will recognize that functionally each may have unique characteristics, functions and/or operations which may be specific to its individual capabilities and/or deployment.

Data received by the BAS 390 from a typical NE, for example, may include caller information, usage information, network access times, one or more dates of access, geographical information, origination and destination of communication information, etc.

Detailed Network Data (DND) 305, such as internet protocol (IP) data, is provided to the BAS 304 at 305. The DND 305 may include customer data, operator data, and other sourced data (such as that from a firewall 303A or router 303B) which reflects specific activities of devices which have a network activity associated with the network. A correlator 310 within the BAS provides for correlating the data of the NEs received by the BAS with the data of the DND to create correlated bit metadata reflecting activity of NEs on the network. Correlated data is passed from the correlator 310 to the classifier 320 wherein the classifier processes data to be arranged in one or more classifications; similarly, the classifier may also act to categorize the correlated data to be in one or more categories defined by the operator, customer, or similar.

The classifier 320 may have a diversity of predetermined classifications 325 arising from the operator, customer or pre-set based values based on the type of activity. For instance, in one embodiment, three event-based categories of activities are defined to include: 1) Billable Event (e.g., opening a door) at 312; 2) Original Equipment Manufacturer (OEM) event (e.g., telematic engine data) at 314; and, 3) Third Party Billable event (e.g, media utilization) at 316. Data is then categorized into one of the three categories.

From FIG. 3, after classification, classified data is then input to the ranking engine 330. The ranking engine is operative to prioritize the categorized data, from the one or more categories, into an invoicing structure (i.e., hierarchy) for billing to the customer. The ranking engine 330 provides for arranging the categorized events into their appropriate invoices so the categorized activities are arranged to fulfill the customer's or operator's billing needs. From FIG. 3, the categorized events (classified) of 325 are output as arranged invoices of 340, 341, and 342 respectively, preferably via an invoice generator. It will be appreciated that the one or more invoices may be generated by the present invention in response and in relation to the correlation, classification and ranking methodologies of the present invention.

Preferably, in one or more embodiments, the arranged invoices provide billing information to the customer in a manner and arrangement which minimizes the need for customer feedback, improves the clarity of invoiced information to the customer, and advantageously enhances customer experience by providing event-based invoicing over subscription-centric invoicing. It will be further appreciated by those skilled in the art that the present invention, in one or more embodiments, provides for adjusting billing details, such as invoicing, in advance of the customer receiving the billings using the billing system architecture of the present invention.

Figure 4:
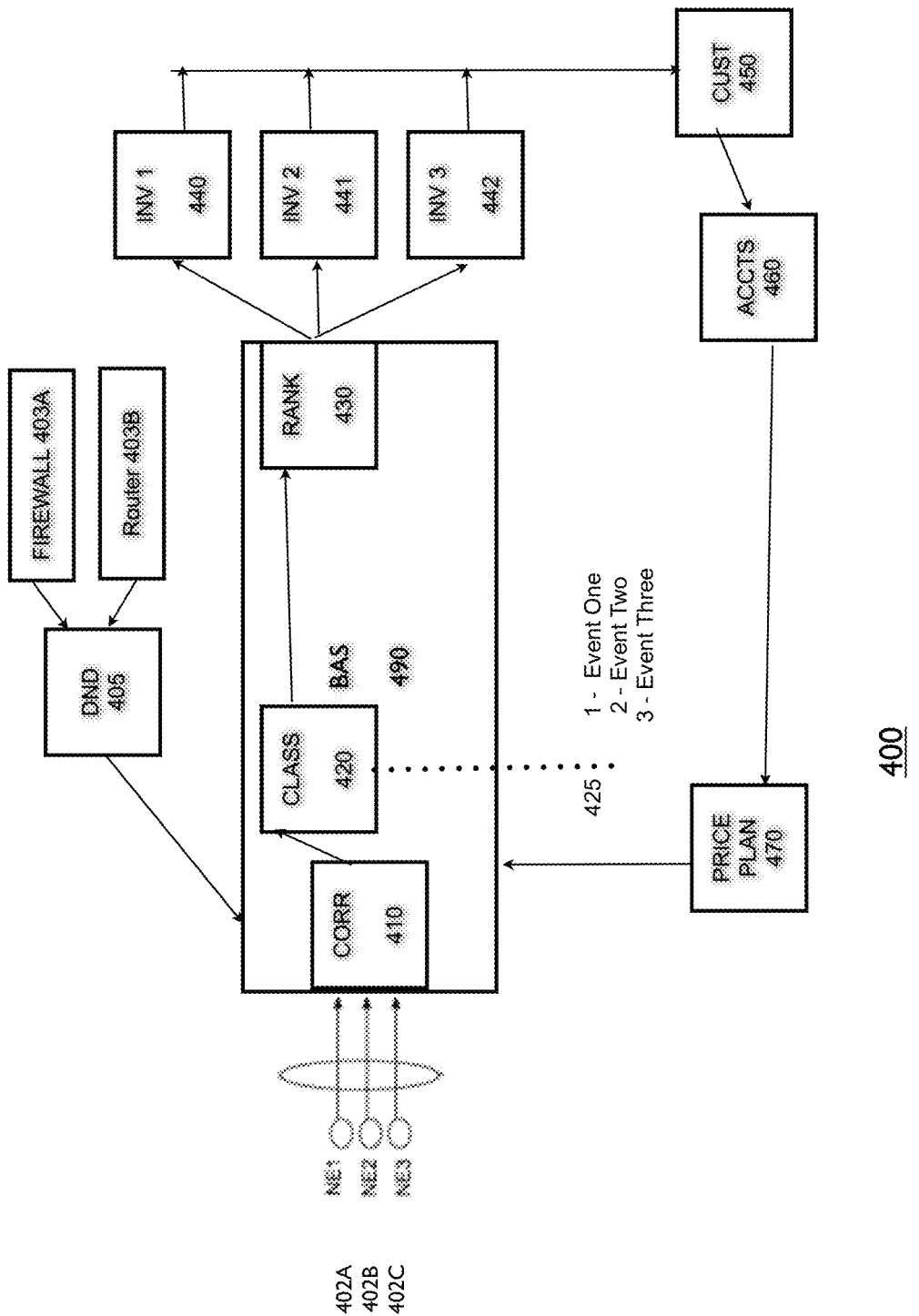
FIG. 4 is a flow chart of the operation of a billing and analytics architecture capable of providing billing invoices in response to one or more of a customer's network elements, in accordance with one or more embodiments of the present invention.

FIG. 4 is a flow chart of the operation of a billing and analytics architecture 400 capable of providing billing invoices in response to one or more of a customer's network elements, in accordance with one or more embodiments of the present invention in which categorized billing invoices 440, 441, 442 are provided in response to one or more of a customer's network elements 402A, 402B, 402C.

In one embodiment, the present invention comprises one or more NEs (402A, 402B, 402C) and a correlating BAS 490 having a correlator 410, a classifier 420 and a ranking engine 430 or generating one or more invoices in response to a predetermined method of correlating, classifying and ranking billable events associated with the network. The present invention further comprises a customer function 450, an accounting and sales department 460, and a Price Plan System 470.

From FIG. 4, each NE provides metadata to the BAS 490. Data received by the BAS 490 from a typical NE, for example, may include caller information, usage information, network access times, one or more dates of access, geographical information, origination and destination of communication information, etc. It will be appreciated by those skilled in the art that the present invention is not so limited. Detailed Network Data (DND) 405 is provided to the BAS. A correlator 410 within the BAS provides for correlating the data of the NEs. Correlated data is passed from the correlator 410 to the classifier 420. The classifier 420 may have one or more predetermined classifications 425 arising from the operator, customer or pre-set based values based on the type of activity. Data is then categorized into one of the three categories.

From FIG. 4, after classification, classified data is then input to the ranking engine 430 and output as arranged invoices of 440, 441, and 442 respectively, preferably via an invoice generator. Invoices are then passed to the customer via the customer function 450 and feedback from the customer function is shared with the accounts department at 460. The account department, in response to the feedback and billing activities of a particular customer, may update or otherwise modify the pricing plans associated with the customer via the price Plan System 470, where the Price Plan System would further provide for one or more coordinated or predetermined pricing plans to the BAS and initially provides a price plan for the network elements. Inputs to the price plan system are an initial price plan and a manual override of learned values.

System Overview

Figure 5:
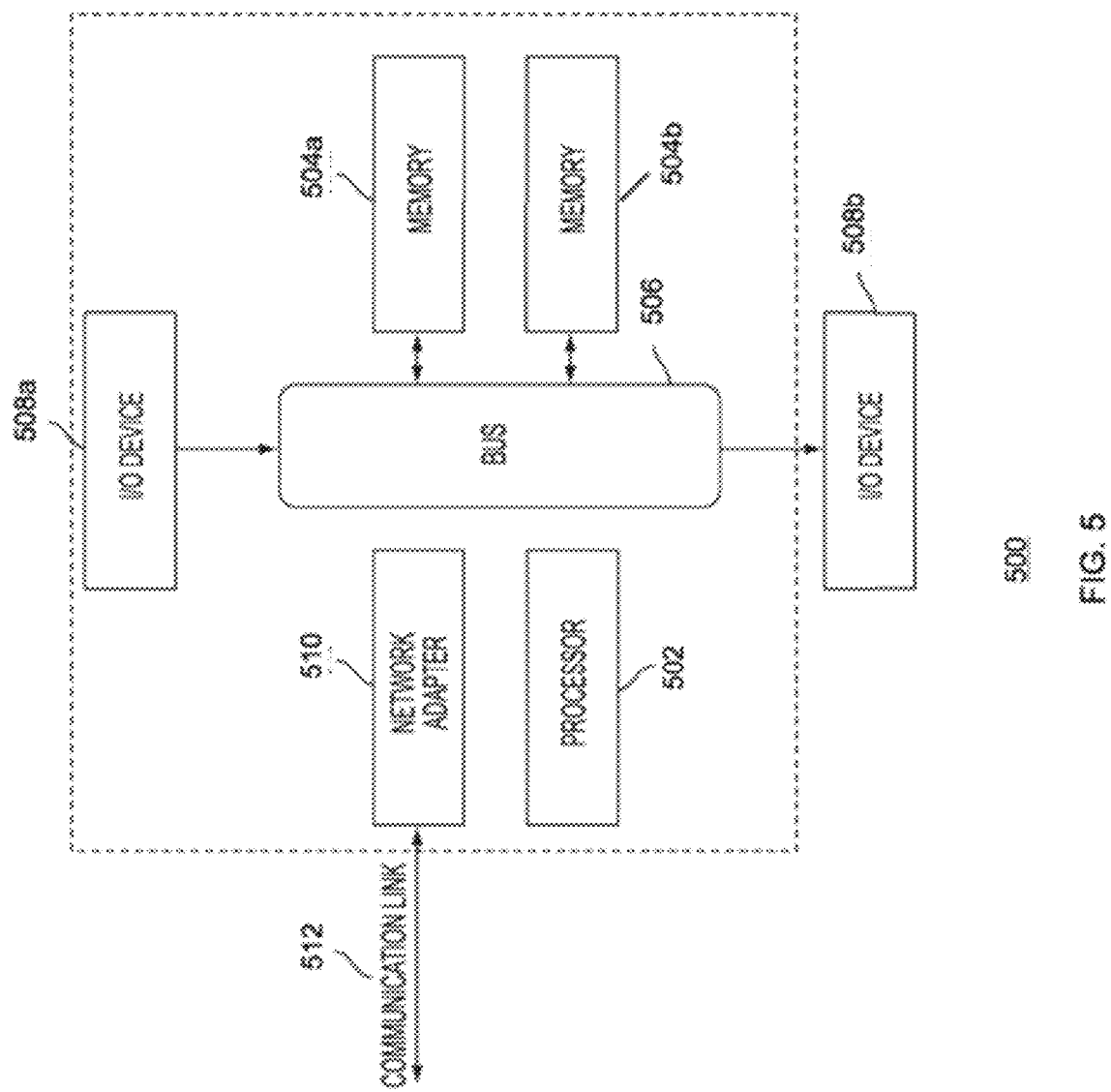
FIG. 5 illustrates a data processing system suitable for storing the computer program product and/or executing program code of the present invention in accordance with one or more embodiments.

FIG. 5 illustrates a data processing system 500 suitable for storing the computer program product and/or executing program code in accordance with an embodiment of the present invention. The data processing system 500 includes a processor 502 coupled to memory elements 504a-b through a system bus 506. In other embodiments, the data processing system 500 may include more than one processor and each processor may be coupled directly or indirectly to one or more memory elements through a system bus.

Memory elements 504a-b can include local memory employed during actual execution of the program code, bulk storage, and cache memories that provide temporary storage of at least some program code in order to reduce the number of times the code must be retrieved from bulk storage during execution. As shown, input/output or I/O devices 508a-b (including, but not limited to, keyboards, displays, pointing devices, etc.) are coupled to the data processing system 500. I/O devices 508a-b may be coupled to the data processing system 500 directly or indirectly through intervening I/O controllers (not shown).

In FIG. 5, a network adapter 510 is coupled to the data processing system 502 to enable data processing system 502 to become coupled to other data processing systems or remote printers or storage devices through communication link 512. Communication link 512 can be a private or public network. Modems, cable modems, and Ethernet cards are just a few of the currently available types of network adapters.

Figure 6:
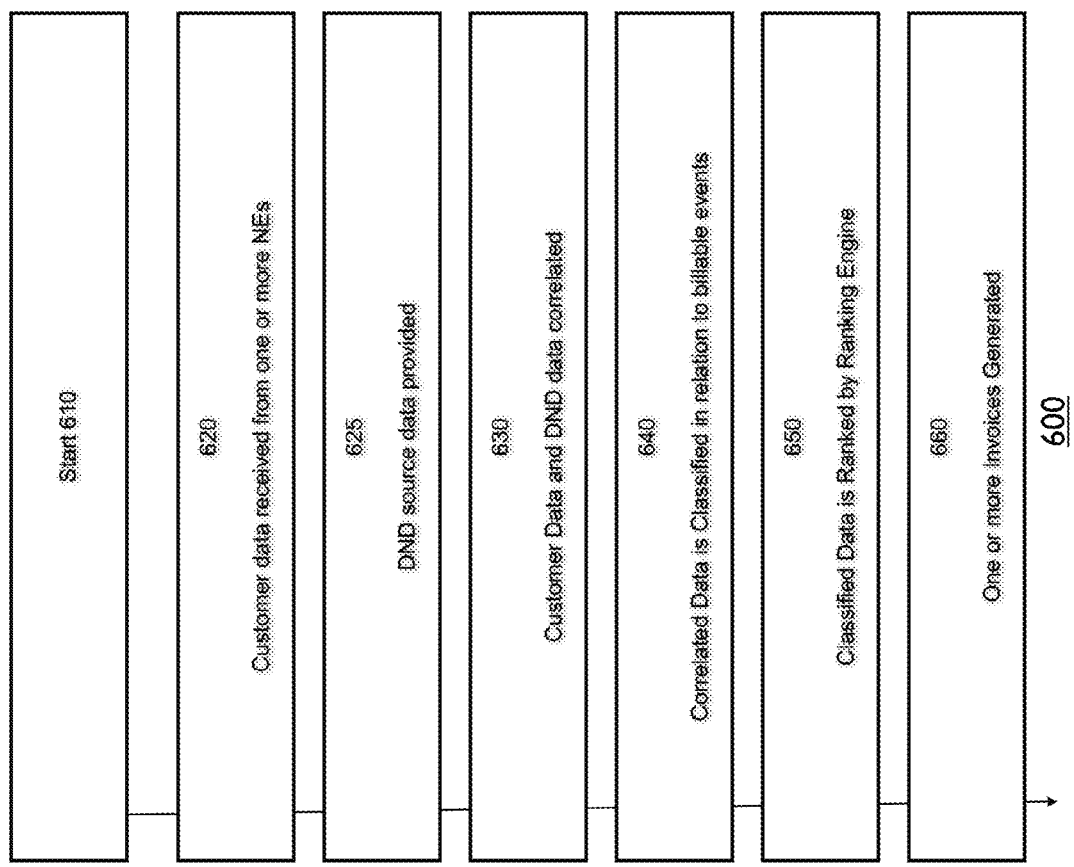
FIG. 6 is a block diagram of an operative billing and analytics architecture of a computer implemented method for use in machine to machine (M2M) network in accordance with an embodiment.

FIG. 6 is a block diagram of an operative billing and analytics architecture of a computer implemented method for use in machine to machine (M2M) network in accordance with an embodiment.

From FIG. 6, the present invention starts an operation at 610. At 620, customer data is received from one or more network elements to a BAS. At 625, one or more detailed network data sources provides additional information to a BAS. At 630, the customer data received and the received detailed network data source information is correlated. At 640, the correlated data is classified in relation to one or more billable events. At 650, the classified data is then ranked by a ranking engine in a predetermined manner in preparation for generating one or more invoices of billable event activities to a customer. At 660, the one or more invoices are generated wherein each invoice in arranged to reflect billable activities and is preferably not singly arranged to reflect activity by a device-centric model.

Any theory, mechanism of operation, proof, or finding stated herein is meant to further enhance understanding of the present invention and is not intended to make the present invention in any way dependent upon such theory, mechanism of operation, proof, or finding. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow.

Similarly, it is envisioned by the present invention that the term communications network includes communications across a network (such as that of a M2M but not limited thereto) using one or more communication architectures, methods, and networks, including but not limited to: Code division multiple access (CDMA), Global System for Mobile Communications (GSM) ("GSM" is a trademark of the GSM Association), Universal Mobile Telecommunications System (UMTS), Long Term Evolution (LTE), 4G LTE, wireless local area network (WIFI), and one or more wired networks.

Accordingly, a system and method in accordance with one or more embodiments presented above overcomes the challenges of existing practices and provides a more robust and convenient architecture enabling improved information and billing details to be provided to a customer, operator or other. The present invention also provides for more accurate and aligned accounting of a user's revenues or expenses for an M2M or similar network. Furthermore such a system may minimize the need for customer feedback and concerns. Additionally, such a system and method in accordance with an embodiment can be utilized to identify new billing opportunities in such a network.

Embodiments described herein can take the form of an entirely hardware implementation, an entirely software implementation, or an implementation containing both hardware and software elements. Embodiments may be implemented in software, which includes, but is not limited to, application software, firmware, resident software, microcode, etc.

The steps described herein may be implemented using any suitable controller or processor, and software application, which may be stored on any suitable storage location or computer-readable medium. The software application provides instructions that enable the processor to cause the receiver to perform the functions described herein.

Furthermore, embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include DVD, compact disk-read-only memory (CD-ROM), and compact disk-read/write (CD-R/W).

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims. Many other embodiments of the present invention are also envisioned.

What is claimed is:

1. A computer implemented method for use in machine to machine (M2M) network; the method comprising:
   receiving customer information from one or more network elements,
   categorically correlating received customer information with one or more detailed network data sources, wherein categorically correlating customer information further comprises correlating received customer information with one or more detailed network data sources; and classifying correlated data by one or more predetermined events; and
   generating one or more activity invoices in a predetermined ranking in accordance with one or more billable events; wherein the one or more predetermined events are associated with the one or more billable events; wherein the predetermined ranking includes ranking the one or more billable events by a predetermined hierarchy for generating one or more activity invoices in relation thereto; wherein the one or more activity invoices are provided to a customer; wherein the customer further provides feedback to an accounts department function; wherein the accounts department function provides for modifying a price plan system of the customer to optimize the one or billable events for the customer.

2. The method of claim 1, wherein the one or more activity invoices arrange a first billable activity on a first invoice and a second billable activity on a second invoice.

3. The method of claim 1, wherein the one or more activity invoices are generated by an invoice generator.

4. The method of claim 3, wherein the network elements comprise any type of device, appliance, terminal, remote device, or wireless asset.

5. A system for use in an machine to machine (M2M) network, the system comprising:
   a price plan system for providing a guaranteed price plan for one or more network elements; wherein the one or more network elements comprise any type of device, appliance, terminal, remote device, or wireless asset; and
   a billing and analytics system for receiving the guaranteed price plan for i) generating one or more invoices ranked in accordance to one or more billable events in relation to data received from one or more network elements of the customer correlated in relation to detailed network data sources, and ii) receiving an adapted price plan to optimize feedback from a customer in relation to one or more received invoices; wherein the billing and analytics system produces and reports for the customer based upon the usage of the one or more network elements in relation to the one or more billable events; wherein the billing and analytics system includes a correlator for correlating received customer information with one or more detailed network data sources, a classifier for classifying correlated data by one or more predetermined events, and a ranking engine for ranking the one or more billable activities in a predetermined manner for invoicing.

6. The system of claim 5, wherein the one or more predetermined events are associated with the one or more billable events.

7. The system of claim 5, wherein the one or more detailed network data sources includes one or more of a router and firewall.

8. A computer program product containing a computer readable medium for use in machine to machine (M2M) network; the program instructions for:
   receiving customer information from one or more network elements,
   correlating received customer information with one or more detailed network data sources,
   classifying correlated information in relation to one or more billable events,
   ranking information classified in relation to one or more billable events in a predetermined manner,
   generating one or more activity invoices; and
   providing a customer function, an accounting function, and a price plan system, wherein the customer further provides feedback to an accounts department function and the accounts function provides for modifying a price plan system of the customer function to optimize the one or billable events for the customer function.

9. The computer program product of claim 8 which includes providing one or more activity invoices as one or more billing invoices to a customer function.

10. The computer program product of claim 8, wherein the one or more detailed network data sources includes one or more of a router and firewall.

* * * * *